Patented Feb. 13, 1923.

1,445,366

UNITED STATES PATENT OFFICE.

EARL P. STEVENSON, OF CAMBRIDGE, MASSACHUSETTS, ASSIGNOR TO ARTHUR D. LITTLE, INC., OF CAMBRIDGE, MASSACHUSETTS, A CORPORATION OF MASSACHUSETTS.

METHOD OF PRODUCING ZINC OXIDE.

No Drawing.  Application filed November 11, 1919.  Serial No. 337,319.

*To all whom it may concern:*

Be it known that I, EARL P. STEVENSON, a citizen of the United States, residing at Cambridge, in the county of Middlesex and State of Massachusetts, have invented certain new and useful Improvements in Methods of Producing Zinc Oxide; and I do hereby declare the following to be a full, clear, and exact description of the invention, such as will enable others skilled in the art to which it appertains to make and use the same.

The present invention relates to a method of treating zinc bearing materials and more particularly to a process of producing zinc oxide from such materials.

The uses of zinc oxide in the practical arts are manifold and in all cases it is highly desirable that the oxide shall be pure white in color, although in some instances this is not absolutely essential. The color in the zinc oxide is normally due to the presence of contaminating traces of the oxide of other metals as copper, iron, cadmium, etc., although this discoloration may occur in a pure zinc oxide due to the physical treatment to which it may have been subjected.

At the present time there are relatively few sources from which a zinc oxide of this character may be obtained, the sources in this country being limited substantially to certain relatively small bodies of carbonate ore.

The object of the present invention is to provide an efficient and relatively inexpensive method applicable to various forms of zinc bearing materials which will produce zinc oxide of a pure white color and free from contaminating traces of other metals.

With this object in view, a feature of the invention contemplates the utilization of the basic sulphate of zinc produced as set forth in a co-pending application of Stevenson, Serial No. 326,283 filed September 25, 1919. This compound of zinc is first digested with a soluble alkali and the resulting precipitate after separation from the solution is then calcined at a low heat to produce zinc oxide. The product resulting from this method is pure white in color and compares favorably with the highest grade of zinc oxide produced by any other known method.

The process by which this superior grade of zinc oxide is produced may consist of the following steps beginning with the initial treatment of the zinc bearing material and ending with the commercial product. In case the zinc bearing ore is in the form of a sulphide, the zinc may be converted into an oxide form by roasting, and in the same manner if the ore contains zinc in the form of a carbonate, it may be converted into an oxide form by calcining. A mixture in which zinc occurs either as an oxide, carbonate, or hydroxide is then treated in a closed chamber with a solution of ammonium sulphate having preferably about 30% concentration and at a temperature of approximately 100° centigrade. In this connection it may be stated, however, that the concentration of the solution may vary from 20% to 40% and the temperature from 100° to 150° centigrade and still obtain the desired form of precipitate. The solution of ammonium sulphate is then cooled to precipitate out a basic sulphate of zinc having a well defined crystalline structure of plate-like form. This precipitate, after being filtered off from the solution, is first washed and then dried at a temperature sufficiently high to completely decompose whatever ammonium salts it may be contaminated with. The precipitate is then digested with a soluble alkali, such for example as sodium carbonate. The alkali decomposes the sulphate of zinc, converting it into a mixture of zinc hydroxide and zinc carbonate. This precipitate of hydroxide and carbonate is next separated from the solution by filtering and is then washed, dried and finally calcined at a low heat to produce commercial zinc oxide. The fact that the precipitate is in the form of a carbonate renders it unnecessary to employ an extremely high temperature for its conversion into an oxide, it having been found that a temperature of about 350° centigrade is sufficient for this purpose. In order to produce the oxide from other zinc compounds by calcining, it is necessary to subject the compound to a temperature of about 1000° centigrade which turns the zinc compound a bright yellow in color and frequently causes the resultant oxide to assume a cream color rather than a pure white. The advantage of dealing with zinc in the form of a carbonate resides in the fact that the low temperature employed in the calcining operation is insufficient to permanently discolor the resultant oxide.

It will be observed that the above described method of producing zinc oxide embodies the utilization of the basic sulphate of zinc having certain characteristic features hereinbefore described. It may be added that this basic sulphate of zinc so called differs from the usual or normal zinc sulphate in that it contains a substantially higher percentage of zinc than the normal sulphate.

In case the zinc bearing material initially treated contains impurities in certain forms, they may be removed before precipitation of the basic sulphate of zinc in the following manner: The presence of iron in the form of ferric oxide, which condition may always be obtained by a proper preliminary roasting, is not objectionable, as this ferric oxide will not dissolve in ammonium sulphate solution. In a like manner, manganic oxide is not soluble in the solution of ammonium sulphate. The manganic oxide is more difficult to obtain, however, through roasting and it may be advisable and necessary under certain conditions to add a suitable oxidizing agent to the hot solution of ammonium sulphate in order to convert any manganous oxide which may be present into the corresponding manganic oxide or manganese dioxide. Ammonium persulphate is apparently preferable for this purpose although other oxidizing agents such as chlorine, calcium oxychloride (chloride of lime) and permanganates may also be used. If any cadmium or copper be present in the zinc bearing material initially treated, they will be dissolved by the ammonium sulphate along with the zinc but may be eliminated from the hot extraction liquor by treatment with metallic zinc which precipitates the cadmium, copper, and also silver according to well known metallurgical principles. Compounds of lead sulphate and lead oxide, in both of which conditions lead may occur, are insoluble in the solution of ammonium sulphate.

It will be seen from the foregoing description that the present process results in the formation of a zinc oxide free from discoloration and which may be employed as a pigment either in paints or enamels, as a material for use in articles of celluloid or artificial ivory, and as an antiseptic ointment, all of these fields being limited to a zinc oxide of the highest grade.

What is claimed is:

1. A process for the production of zinc oxide which consists in treating a zinc bearing material with a hot concentrated solution of ammonium sulphate, cooling the solution to precipitate out a basic sulphate of zinc, digesting the basic sulphate with a soluble alkali and calcining the precipitate formed in the soluble alkali to produce zinc oxide.

2. A process for the production of zinc oxide which consists in treating zinc bearing material with a hot concentrated solution of ammonium sulphate, cooling the solution to precipitate out a basic sulphate of zinc, digesting the basic sulphate with a solution of an alkaline carbonate and finally calcining the precipitate of zinc carbonate-zinc hydroxide formed to produce zinc oxide.

3. A process for the production of zinc oxide which consists in treating zinc bearing material with a hot concentrated solution of ammonium sulphate, treating the solution with re-agents while still hot to remove other metals therefrom, cooling the solution to precipitate out a basic sulphate of zinc, digesting the basic sulphate with a solution of a carbonate of an alkali metal and finally calcining the zinc carbonate-zinc hydroxide thus formed to produce zinc oxide.

4. A process for the production of zinc oxide which consists in treating zinc bearing material with a hot concentrated solution of ammonium sulphate, treating the solution with re-agents while still hot to remove other metals, cooling the solution to precipitate out a basic sulphate of zinc, washing, drying the basic sulphate at a temperature high enough to decompose the ammonium salt with which it is contaminated, digesting the basic sulphate with a solution of sodium carbonate and finally calcining the zinc carbonate-zinc hydroxide thus formed to produce zinc oxide.

EARL P. STEVENSON.